United States Patent [19]

Sugawara

[11] Patent Number: 4,680,655
[45] Date of Patent: Jul. 14, 1987

[54] DISK SUPPORTING DEVICE

[75] Inventor: Katsuyuki Sugawara, Miyagi, Japan

[73] Assignee: Alps Electric Co., Ltd., Japan

[21] Appl. No.: 822,061

[22] Filed: Jan. 24, 1986

[30] Foreign Application Priority Data

Jan. 24, 1985 [JP] Japan .................................. 60-8945[U]

[51] Int. Cl.$^4$ ............................................ G11B 17/02
[52] U.S. Cl. ...................................... 360/97; 360/99; 369/270
[58] Field of Search ................................... 360/97–99; 369/270

[56] References Cited

U.S. PATENT DOCUMENTS 4,149,207 4/1979 Porter et al. ........................... 360/99
4,445,155 4/1984 Takahashi et al. ..................... 360/99

Primary Examiner—Robert S. Tupper
Attorney, Agent, or Firm—Guy W. Shoup

[57] ABSTRACT

A magnetic disk supporting device for a magnetic recording and playback apparatus including an annular table, an annular yoke and a generally annular leaf spring which are disposed one upon another and surround an upright shaft extending from a disk driving unit, and a disk drive pin upstanding from the leaf spring, extending through the yoke and the table and having an upper end projecting above the table. A bush surrounds the shaft adjacent to the top thereof and is secured thereto. The table, yoke and leaf spring are fitted about the bush and held together by the bus0. The table has a plurality of bosses which position it relative to the leaf spring. The table is formed from a magnetic material.

7 Claims, 6 Drawing Figures

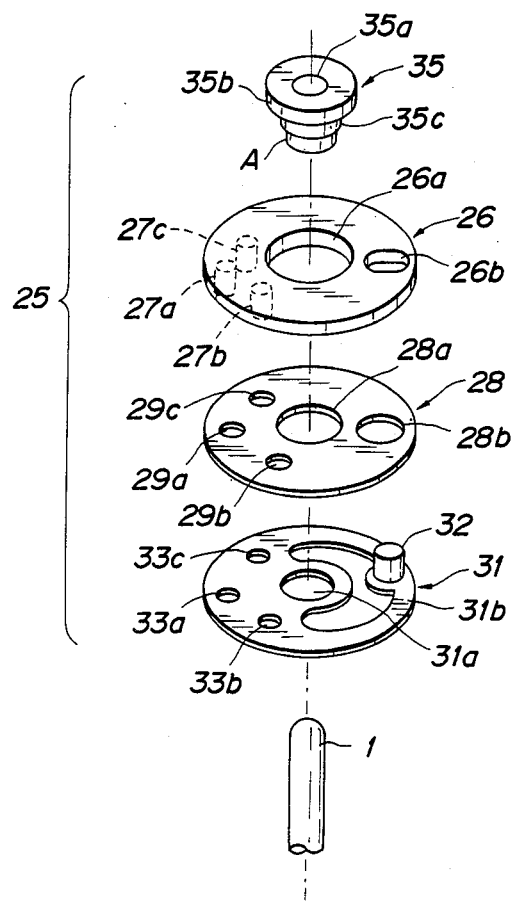
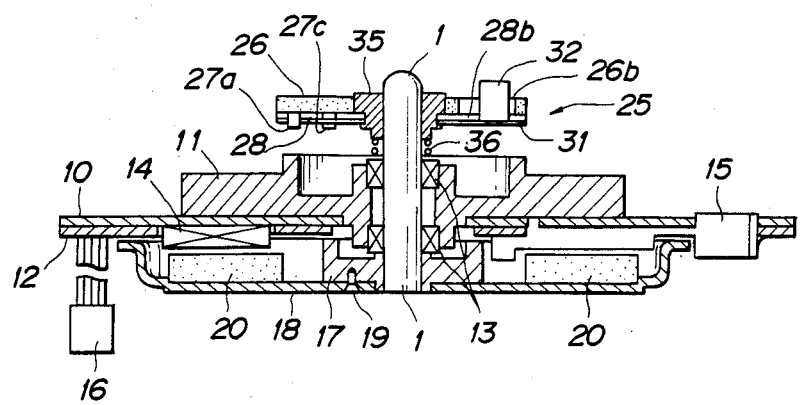

DISK SUPPORTING DEVICE

BACKGROUND OF THE INVENTION

1. Field of the Invention

This invention relates to a device for supporting magnetic disk rotatably in a magnetic recording and playback apparatus.

2. Description of the Prior Art

A small magnetic disk having a diameter of, say, 3.5 inches usually has a central hub by which it is rotatably mounted on a disk supporting device in a magnetic recording and playback apparatus. The disk supporting device is typically of the construction as shown in FIGS. 5 and 6. It has in its center a shaft 1 to which an electric motor not shown is connected for rotating it clockwise as viewed in FIG. 5. A table 2 surrounds the shaft 1 and is secured thereto. The table 2 has an annular recess 2a at its top. An annular yoke 3 is secured to the bottom of the recess 2a and a rubber magnet 4 is secured to the yoke 3.

An annular leaf spring 5 is secured to the bottom of the table 2 by screws 6. A disk drive pin 7 is upstanding from the leaf spring 5 and extends through the table 2, the yoke 3 and the magnet 4. The pin 7 is located between the shaft 1 and the outer periphery of the table 2 and has an upper end exposed above the magnet 4. The yoke 3 has a projection which defines a stop 8 facing the pin 7 at a distance x therefrom. A slider 9 is fitted about the shaft 1 at the top of the table 2.

If a magnetic disk is placed on the device, its central hub, which is formed from a magnetic material, is attracted by the magnet 4. The pin 7 is pressed down by the hub, as the leaf spring 5 is deformed. The hub has a groove or hole. If the shaft 1 is rotated, the pin 7 is urged by the spring 5 to fit in the groove or hole of the hub and starts rotating the disk. The disk imparts a certain resistance to the rotation of the pin 7 and as a result, the pin 7 tends to incline. Such inclination is restricted by the stop 8.

The device as hereinabove described has a number of drawbacks as will hereunder be summarized.

(1) The job of assembling the device is inefficient, as separate steps are, for example, required for joining the yoke 3 and the leaf spring 5 to the opposite sides, respectively, of the table 2.

(2) Insofar as the yoke 3 and the leaf spring 5 are joined to the table 2 separately, the distance x between the pin 7 and the stop 8 is very likely to lack consistency due to possible inconsistencies in the manufacture or assembly of the yoke 3 or the spring 5. If the distance x is too large, the pin 7 is inclined to an undesirable extent when it is driving the disk. The undue inclination of the pin 7 gives rise to a reduction in accuracy of, for example, information recording on the disk. If the distance x is zero, i.e., if the pin 7 contacts the stop 8, the pin 7 fails to move up or down smoothly. In order to correct any such inconsistency of the distance x, it is necessary to loosen the screws 6 and adjust the position of the leaf spring 5 relative to the stop 8 after the device has once been assembled. This adjustment naturally complicates the job of manufacturing the device.

(3) The device is composed of an unreasonably large number of parts from the table 2 to the slider 9.

SUMMARY OF THE INVENTION

Under these circumstances, it is an object of this invention to provide a disk supporting device which is simple in construction and easy to assemble, and which is so constructed that the various parts thereof can easily be positioned accurately relative to one another.

This object is attained by a device including an annular table, an annular yoke and an annular leaf spring which are disposed one upon another and surround an upright shaft extending from a disk driving unit, and a disk drive pin upstanding from the leaf spring, extending through the yoke and the table and having an upper end projecting above the table, characterized by comprising a bush surrounding the shaft adjacent to the top thereof and secured thereto, the table, yoke and leaf spring being fitted about the bush and held together by the bush, the table having a plurality of bosses which position it relative to the leaf spring, the table being fromed from a magnetic material.

The bush is easily deformable to facilitate the assembly of the table, the yoke and the leaf spring by a single operation. This greatly improves the efficiency of manufacture of the device.

The bosses which are formed on the table position it relative to the leaf spring. The table has a hole through which the pin extends loosely. The distance between the pin and the wall defining the hole through which it extends is easy to maintain accurately only if the bosses and the holes formed through the leaf spring for receiving the bosses are formed accurately. This distance does not require any adjustment after the device has been assembled.

The distance between the pin and the wall of the hole formed through the table and defining a stop for the pin is consistent for all the products. A magnetic disk can always be positioned accurately for reading or writing by a magnetic head.

The device of this invention consists of a smaller number of parts than the conventional device shown in FIGS. 5 and 6, and is thus less costly to manufacture.

These and other features and advantages of this invention will be apparent from the following description and the accompanying drawings.

BRIEF DESCRIPTION OF THE DRAWINGS

FIG. 3 is an exploded perspective view showing the device of FIGS. 1 and 2 prior to assembly on a reduced scale;

FIG. 4 is a diametrical sectional view of a disk driving unit including the device assembled in accordance with FIG. 3;

DETAILED DESCRIPTION OF THE INVENTION

Figure 1:
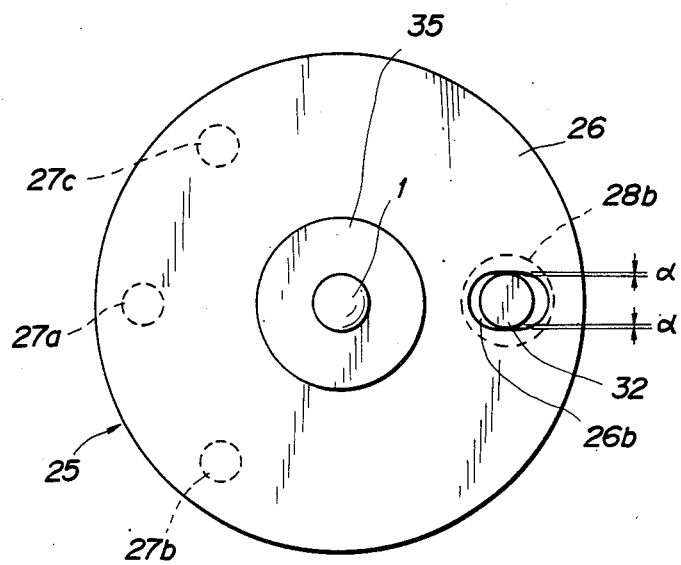
FIG. 1 is a top plan view of a disk supporting device embodying this invention.

Referring first to FIG. 4 of the drawings, there is shown by way of example a disk driving unit mounted on a stator bracket 10 which is attached to a chassis in a magnetic recording and playback apparatus. It includes a housing 11 secured on the bracket 10, and an upright shaft 1 supported rotatably by bearings 13 in the center of the housing 11. A plurality of equally spaced apart coils 14 are disposed under the bracket 10 along the circumference of a circle having its center on the shaft 1. A base plate 12 and a sensor 15 for detecting the rotating speed of an electric motor are also mounted under the bracket 10. The base plate 12 is provided with a plurality of electric circuits which are connected to the coils 14 and the sensor 15, respectively. The circuits are also connected by a connector 16 to external control devices. A cord wheel 17 is fitted about the shaft 1 at its lower end. A rotor 18 is secured to the cord wheel 17 by screws 19. An annular magnet 20 is secured to the rotor 18 and faces the coils 14. The magnet 20 has a plurality of N and S poles which are located alternately along the magnet 20.

Figure 2:
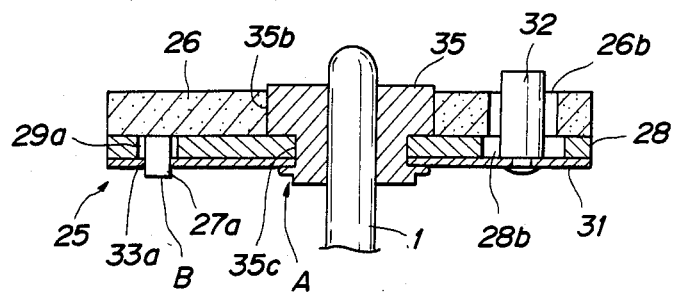
FIG. 2 is a diametrical sectional view, partly in side elevation, of the device shown in FIG. 1.
Figure 5:
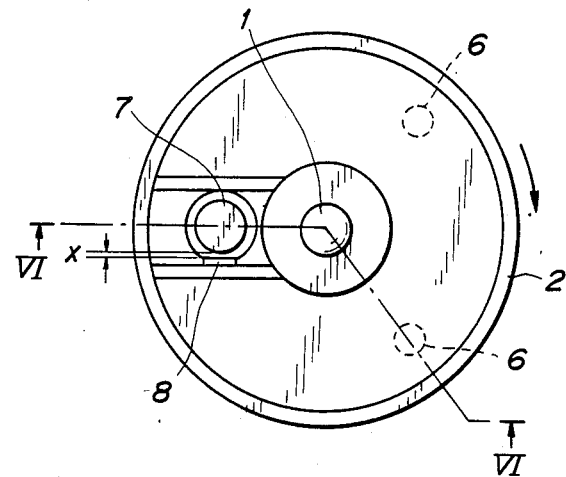
FIG. 5 is a top plan view of a conventional disk supporting device.
Figure 6:
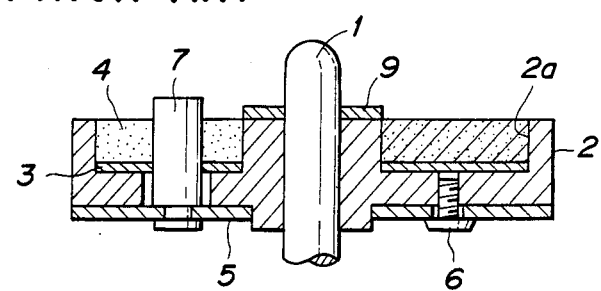
FIG. 6 is a sectional view taken along the line VI—VI of FIG. 5.

A disk supporting device embodying this invention is shown generally at 25 in FIG. 4, and in greater detail in FIGS. 1 to 3. The device 25 includes an annular table 26 which is wholly formed from a plastic magnet. The table 26 has a mounting hole 26a at its center, and a generally oval stop hole 26b which is formed between the inner and outer edges thereof. The table 26 also has three bosses 27a to 27c secured to its bottom by, for example, press fitting. The bosses 27a to 27c are located on the opposite side of the mounting hole 26a from the stop hole 26b, and equally spaced apart from one another along the circumference of a circle which is concentric to the hole 26a.

A yoke 28 is disposed under the table 26 and comprises an annular plate of a magnetic material. The yoke 28 has a mounting hole 28a at its center. The hole 28a is coaxial with, but smaller in diameter than, the hole 26a of the table 26. The yoke 28 also has a clearance hole 28b formed between its inner and outer edges. The hole 28b is coaxial with the stop hole 26b of the table 26, but considerably greater in diameter than any portion of the hole 26b, as is obvious from FIG. 1. The yoke 28 also has three holes 29a to 29c formed on the opposite side of its central hole 28a from its hole 28b. The holes 29a to 29c are axially aligned with the bosses 27a to 27c, respectively, and greater in diameter than the respective bosses 27a to 27c depending from the table 26.

A leaf spring 31 is disposed under the yoke 28 and comprises a circular plate of a spring material. The leaf spring 31 has at its center a mounting hole 31a which is equal in diameter to the central hole 28a of the yoke 28. The leaf spring 31 also has an arcuate hole formed radially outwardly of its central hole 31a and defining an arcuate arm 31b which extends along a part of the circumference of the leav spring 31, as is obvious from FIG. 3. A disk drive pin 32 is upstanding from the center of the arcuate arm 31b and has a lower end which is deformed to secure the pin 32 to the arm 31b and hence the leaf spring 31. The pin 32 is coaxial with the stop hole 26b of the table 26 and the hole 28b of the yoke 28, and has a diameter which is slightly smaller than the shorter diameter of the oval stop hole 26b. The leaf spring 31 also has three positioning holes 33a to 33c formed on the opposite side of its central hole 31a from the pin 32. The holes 33a to 33c are axially aligned with the bosses 27a to 27c, respectively, and substantially equal in diameter thereto.

A bush 35 surrounds the shaft 1 adjacent to its upper end and is secured thereto. The bush 35 has an axial bore 35a in which the shaft 1 is press fitted adjacent to its upper end. The bush 35 has a varying outside diameter which defines an upper mounting surface portion 35b and a lower mounting surface portion 35c which is smaller in diameter than the upper mounting surface portion 35b. The upper mounting surface portion 35b is equal to, or slightly smaller than, the mounting hole 26a of the table 26 in diameter, so that it may be fitted in the hole 26a to support the table 26. The lower portion 35c is equal to, or slightly smaller than, the central holes 28a and 31a of the yoke 28 and the leaf spring 31, respectively, in diameter, so that it may be fitted i2 the holes 28a and 31a to support the yoke 28 and the spring 31. The bush 35 per se has a lower end which is smaller in outside diameter than any other portion thereof, so that the bush 35 may hold the table 26, the yoke 28 and the leaf spring 31 together when its lower end is deformed or spread radially outwardly, or enlarged in outside diameter as shown at A, as well as the bosses 27a to 27c are likewise worked at their lower ends.

The disk supporting device as hereinabove described may be assembled in accordance with the sequence of procedure which will hereunder be described. The lower end of the disk drive pin 32 is deformed or spread radially outwardly over the lower surface of the leaf spring 31 so that the pi2 32 may be secured to the spring 31. The shaft 1 is press fitted adjacent to its upper end in the axial bore 35a of the bush 35 before it is passed through the bearings 13 as shown in FIG. 4. The table 26, the yoke 28 and finally the leaf spring 31 are inserted about the shaft 1 past its lower end. The central hole 26a of the table 26 is fitted about the upper mounting surface portion 35b of the bush 35, and the central holes 28a and 31a of the yoke 28 and the leaf spring 31, respectively, are fitted about the lower mounting surface portion 35c thereof, while the bosses 27a to 27c are passed through the holes 29a to 29c, respectively, of the yoke 28 and the holes 33a to 33c, respectively, of the spring 31. At the same time, the pin 32 is passed through the clearance hole 28b of the yoke 28 and the stop hole 26b of the table 26, and its upper end projects above the table 26. The lower end of the bush 35 is deformed or spread radially outwardly over the lower surface of the leaf spring 31 as shown at A in FIG. 2, and the lower end of each of the bosses 27a to 27c is likewise deformed as shown at B, whereupon all the parts of the device are held together about the shaft 1. Then, the shaft 1 is connected to the housing 11 rotatably by the bearings 13. A coiled spring 36 is placed about the shaft 1 between the bearings 13 and the bush 35, as shown in FIG. 4.

In the device 25 assembled as hereinabove described, the table 26 and the leaf spring 31 are accurately aligned with each other by the bush 35 and have an accurate radial positional relationship to each other. The table 26 and the leaf spring 31 are accurately positioned along the circumferences thereof, too, by virtue of the bosses 27a to 27c depending from the table 26 and extending through the positioning holes 33a to 33c of the spring 31. The table 26 and the leaf spring 31 can be accurately positioned relative to each other if the central hole 26a of the table 26, the bosses 27a to 27c and the central hole 31a and the positioning holes 33a to 33c of the spring 31 are accurately positioned during their manufacture. Thus, a virtually ideal positional relationship can be realized between the disk drive pin 32 and the wall of the stop hole 26b in the table 26, which defines a stop for the pin 32, if the position of the pin 32 and the shape and position of the stop hole 26b are accurate. The stop hole 26b is substantially oval and its longer axis extends radially of the table 26. Two clearances exist between the diametrically opposite sides of the pin 32 and the adjacent wall portions of the table 26 defining the short axis of the stop hole 26b, as shown at in FIG. 1. The optimum clearances can be defined if the position of the pin 32 and the shape and position of the stop hole 26b are accurate.

In operation, an electric current is supplied to the coils 14 and a magnetic field produced around the magnet 20 imparts a driving force to the rotor 18. This driving force is transmitted to the shaft 1 through the wheel 17, whereby the disk supporting device 25 is rotated.

A magnetic disk having a central hub formed from a magnetic material is inserted through the disk inlet of a magnetic recording and playback apparatus in which the disk supporting device 25 is disposed. The hub is magnetically attracted onto the table 26, while the upper end of the shaft 1 fits in the central hole of the hub.

The disk drive pin 32 is at first kept in its downwardly retracted position by the hub of the disk. As the device 25 rotates, however, the pin 32 is urged by the leaf spring 31 to fit in the groove or hole formed in the hub and starts rotating the disk. Although the pin 32 is caused by the disk to incline to some extent, its inclination is limited by the wall of the stop hole 26b. There is no undue inclination of the pin 32 if the optimum or minimum possible clerrances are maintained between the wall of the stop hole 26b and the pin 32 as hereinbefore described.

A magnetic head is brought into contact with the media on the disk for reading or writing information thereon. Insofar as the inclination of the pin 32 is negligible, there is no inconsistency in rotation between the table 26 and the disk, but it is possible to achieve a high accuracy of information recording or playback.

What is claimed is:

1. In a magnetic disk supporting device for a magnetic recording and playback apparatus including an annular table, an annular yoke and a generally annular leaf spring which are disposed one upon another and surround an upright shaft extending from a disk driving unit, and a disk drive pin upstanding from said leaf spring, extending through said yoke and said table and having an upper end projecting above said table, the improvement which comprises a bush surrounding said shaft adjacent to the top thereof and secured thereto, said table, yoke and leaf spring being fitted about said bush and held together by said bush, said table having a plurality of bosses which position it relative to said leaf spring, said table being formed from a magnetic material.

2. A device as set forth in claim 1, wherein said bush has an upper portion and a lower portion which is smaller in outside diameter than said upper portion, said table having a central hole in which said upper portion of said bush is fitted, while each of said yoke and said leaf spring has a central hole which is smaller in diameter than said central hole of said table and in which said lower portion of said bush is fitted.

3. A device as set forth in claim 2, wherein said table has a hole formed radially outwardly of said central hole thereof, and through which said pin extends, said hole defining a stop for said pin.

4. A device as set forth in claim 3, wherein said bosses depend from said table and are located radially outwardly of said central hole thereof on the opposite side of said central hole from said stop defining hole, each of said yoke and said leaf spring having a plurality of holes through each of which one of said bosses extends, each of said bosses having a lower end spread radially outwardly over the bottom of said leaf spring to hold said leaf spring and said yoke against said table and said upper portion of said bush, while said bush has a lower end projecting below said leaf spring and spread radially outwardly over the bottom of said leaf spring to hold said leaf spring and said yoke against said upper portion.

5. A device as set forth in claim 3, wherein said stop defining hole is generally oval and has a long axis lying radially of said table.

6. A device as set forth in claim 5, wherein said bosses are located in an equally spaced apart relation from one another on the circumference of a circle which is concentric to said central hole of said table.

7. A device as set forth in claim 4, wherein said leaf spring has an arcuate hole formed radially outwardly of said central hole thereof on the opposite side of said central hole from said plurality of holes thereof, said arcuate hole defining on the opposite side thereof from said central hole an arcuate arm having a center to which said pin is secured at its lower end.

* * * * *